US011901147B1

(12) United States Patent
Titus

(10) Patent No.: US 11,901,147 B1
(45) Date of Patent: Feb. 13, 2024

(54) SOLID-STATE CIRCUIT BREAKER THAT TURNS OFF ELECTRONICS BEFORE PRIMARY MAIN CONTACTS ARE OPENED

(71) Applicant: Siemens Industry, Inc., Alpharetta, GA (US)

(72) Inventor: Solomon R. Titus, Cumming, GA (US)

(73) Assignee: Siemens Industry, Inc., Alpharetta, GA (US)

( * ) Notice: Subject to any disclaimer, the term of this patent is extended or adjusted under 35 U.S.C. 154(b) by 0 days.

(21) Appl. No.: 17/822,354

(22) Filed: Aug. 25, 2022

(51) Int. Cl.
*H01H 71/12* (2006.01)
*H01H 71/52* (2006.01)
*H01H 9/16* (2006.01)
*H01H 1/22* (2006.01)

(52) U.S. Cl.
CPC .......... *H01H 71/123* (2013.01); *H01H 1/225* (2013.01); *H01H 9/16* (2013.01); *H01H 71/521* (2013.01)

(58) Field of Classification Search
CPC ........ H01H 9/542; H01H 9/54; H01H 33/596; H01H 33/6661; H01H 33/04; H01H 33/18; H01H 71/123; H01H 71/46; H01H 71/04; H01H 71/1081; H01H 71/0228; H01H 71/1054; H01H 71/68; H01H 71/2481; H02H 7/262
See application file for complete search history.

(56) References Cited

U.S. PATENT DOCUMENTS

2008/0284614 A1* 11/2008 Perez .................. G01R 22/065 340/870.02
2017/0256934 A1 9/2017 Kennedy et al.
2021/0265124 A1* 8/2021 Mazur ................ H01H 71/1081

FOREIGN PATENT DOCUMENTS

CN 214956721 U * 11/2021
WO 2015147826 A1 10/2015
WO 2021043497 A1 3/2021

* cited by examiner

*Primary Examiner* — Bryan R Perez

(57) ABSTRACT

A solid-state circuit breaker configured to turn off electronics before a pair of opposing primary main contacts are opened. The solid-state circuit breaker includes a main mechanism including a pair of opposing primary main contacts. The solid-state circuit breaker further includes electronics including semiconductors and software algorithms that control the power and can interrupt currents. The solid-state circuit breaker further includes a switching system including a secondary switch that is configured to be actuated prior to opening of the primary main contacts. The secondary switch is configured to turn off the power to the electronics of the solid-state circuit breaker before the primary main contacts are opened to eliminate or reduce electrical arcing across the primary main contacts.

20 Claims, 4 Drawing Sheets

SOLID-STATE CIRCUIT BREAKER THAT TURNS OFF ELECTRONICS BEFORE PRIMARY MAIN CONTACTS ARE OPENED

BACKGROUND

1. Field

Aspects of the present invention generally relate to a solid-state circuit breaker includes a secondary switch to turn off electronics before a pair of opposing primary main contacts are opened.

2. Description of the Related Art

In a circuit breaker, the main contacts are usually made of silver alloy and conduct current in closed positions.

When the contacts are parted, an arc is produced. Arcing occurs whenever current is interrupted with contact separation. With the extreme temperature of arcs, they can cause erosion to the contacts and damage to the circuit breakers, and eventually lead to end of life of a circuit breaker.

The best way to avoid such erosion is to eliminate or significantly reduce arcs during current interruption.

Therefore, there is a need for a better solid-state circuit breaker.

SUMMARY

Briefly described, aspects of the present invention relate to a means to turn off the electronics of a residential circuit breaker such as a solid-state circuit breaker before the solid-state circuit breaker's main contacts are opened. This can eliminate or significantly reduce electrical arcing across the main contacts. By adding a secondary switching system strategically positioned within the solid-state circuit breaker's main mechanism, such that a switch is actuated prior to the solid-state circuit breaker's main contacts opening.

In accordance with one illustrative embodiment of the present invention, a solid-state circuit breaker comprises a main mechanism including a pair of opposing primary main contacts. The solid-state circuit breaker further comprises electronics including semiconductors and software algorithms that control the power and can interrupt currents. The solid-state circuit breaker further comprises a switching system including a secondary switch that is configured to be actuated prior to opening of the primary main contacts. The secondary switch is configured to turn off the power to the electronics of the solid-state circuit breaker before the primary main contacts are opened to eliminate or reduce electrical arcing across the primary main contacts.

In accordance with one illustrative embodiment of the present invention, a method of turning off electronics of a solid-state circuit breaker before a pair of opposing primary main contacts are opened. The method comprises providing a main mechanism including the primary main contacts. The method further comprises providing the electronics including semiconductors and software algorithms that control the power and can interrupt currents. The method further comprises providing a switching system including a secondary switch that is configured to be actuated prior to opening of the primary main contacts. The secondary switch is configured to turn off the power to the electronics of the solid-state circuit breaker before the primary main contacts are opened to eliminate or reduce electrical arcing across the primary main contacts.

The above described features and advantages, as well as others, will become more readily apparent to those of ordinary skill in the art by reference to the following detailed description and accompanying drawings. While it would be desirable to provide one or more of these or other advantageous features, the teachings disclosed herein extend to those embodiments which fall within the scope of the appended claims, regardless of whether they accomplish one or more of the above-mentioned advantages.

BRIEF DESCRIPTION OF THE DRAWINGS

For a more complete understanding of the present disclosure, and the advantages thereof, reference is now made to the following descriptions taken in conjunction with the accompanying drawings, wherein like numbers designate like objects.

DETAILED DESCRIPTION

Figure 1:
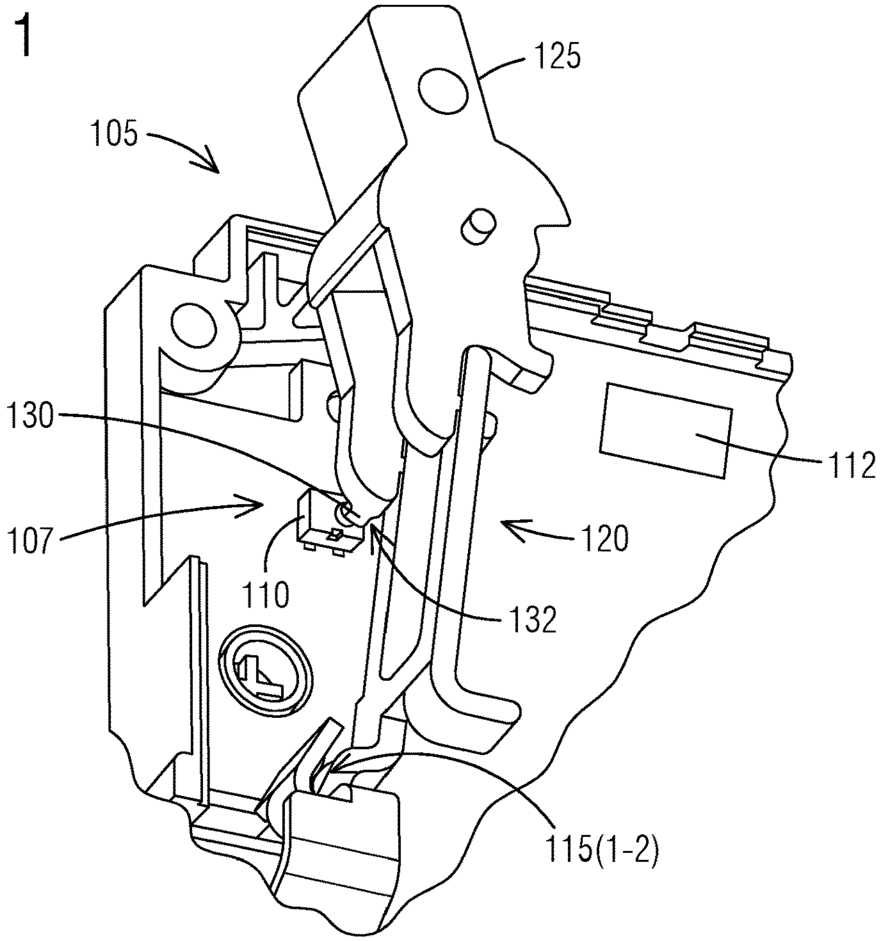
FIG. 1 illustrates a solid-state circuit breaker with an integrated secondary switching system strategically positioned within the solid-state circuit breaker's main mechanism such that a switch is actuated prior to the solid-state circuit breaker's main contacts opening in accordance with an exemplary embodiment of the present invention.

Various technologies that pertain to systems and methods that facilitate an integrated secondary switching system for a solid-state circuit breaker will now be described with reference to the drawings, where like reference numerals represent like elements throughout. The drawings discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged apparatus. It is to be understood that functionality that is described as being carried out by certain system elements may be performed by multiple elements. Similarly, for instance, an element may be configured to perform functionality that is described as being carried out by multiple elements. The numerous innovative teachings of the present application will be described with reference to exemplary non-limiting embodiments.

To facilitate an understanding of embodiments, principles, and features of the present invention, they are explained hereinafter with reference to implementation in illustrative embodiments. In particular, they are described in the context of an integrated secondary switching system for a solid-state circuit breaker. Embodiments of the present invention, however, are not limited to use in the described devices or methods.

The components and materials described hereinafter as making up the various embodiments are intended to be illustrative and not restrictive. Many suitable components and materials that would perform the same or a similar function as the materials described herein are intended to be embraced within the scope of embodiments of the present invention.

These and other embodiments of the integrated secondary switching system for a solid-state circuit breaker according to the present disclosure are described below with reference to FIGS. 1-7 herein. Like reference numerals used in the drawings identify similar or identical elements throughout the several views. The drawings are not necessarily drawn to scale.

Consistent with one embodiment of the present invention, FIG. 1 represents a solid-state circuit breaker 105 with an integrated secondary switching system 107 in which a secondary switch 110 turns off electronics 112 of a residential circuit breaker such as the solid-state circuit breaker 105 before a pair of opposing primary main contacts 115(1-2) are opened in accordance with an exemplary embodiment of the present invention. This reduces electrical arcing across the primary main contacts 115(1-2). By adding the secondary switching system 107 strategically positioned within the solid-state circuit breaker's 105 main mechanism 120 such that secondary switch 110 is actuated prior to the solid-state circuit breaker's 105 primary main contacts 115(1-2) opening.

In one embodiment, the solid-state circuit breaker 105 comprises the main mechanism 120 including the pair of opposing primary main contacts 115(1-2). The solid-state circuit breaker 105 further comprises the electronics 112 including semiconductors and software algorithms that control the power and can interrupt currents. The solid-state circuit breaker 105 further comprises the secondary switching system 107 including the secondary switch 110 positioned within the main mechanism 120 such that the secondary switch 110 is configured to be actuated prior to opening of the primary main contacts 115(1-2). The secondary switch 110 is configured to turn off the power to the electronics 112 of the solid-state circuit breaker 105 before the primary main contacts 115(1-2) are opened to eliminate or reduce electrical arcing across the primary main contacts 115(1-2).

The solid-state circuit breaker 105 further comprises a handle 125 that mechanically turns ON and OFF the solid-state circuit breaker 105. The solid-state circuit breaker 105 further comprises a projection 130 formed on a distal end 132 of the handle 125 to directly actuate the secondary switch 110.

Figure 5:
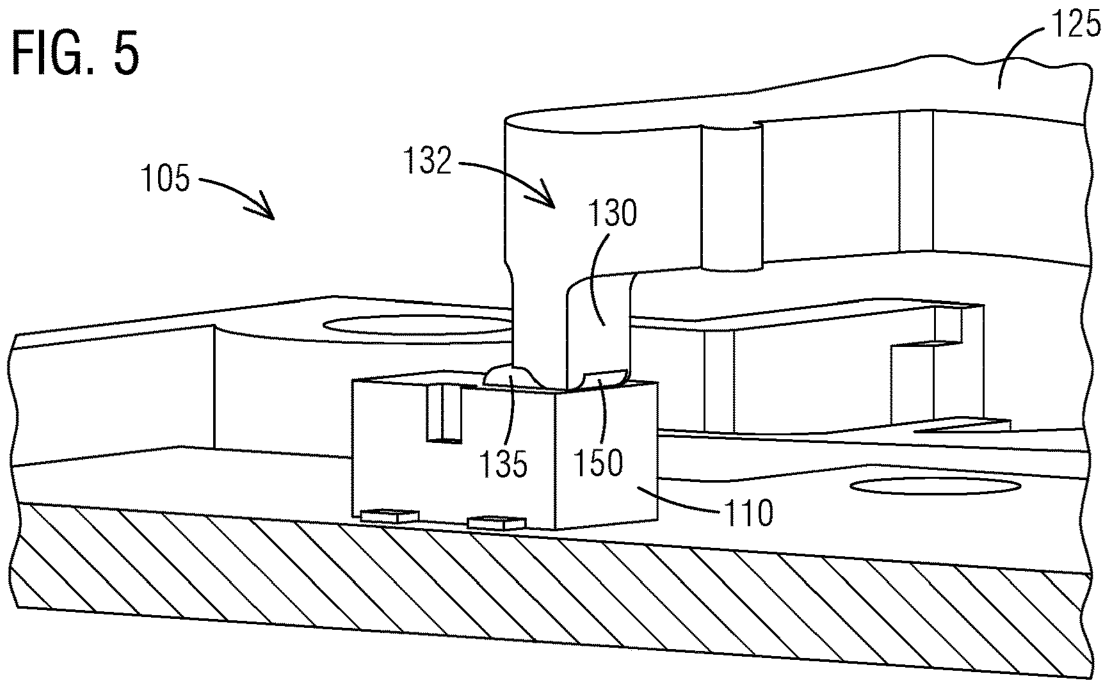
FIG. 5 illustrates a projection on a handle to actuate a secondary switch with the secondary switch in a closed state in accordance with an exemplary embodiment of the present invention.
Figure 6:
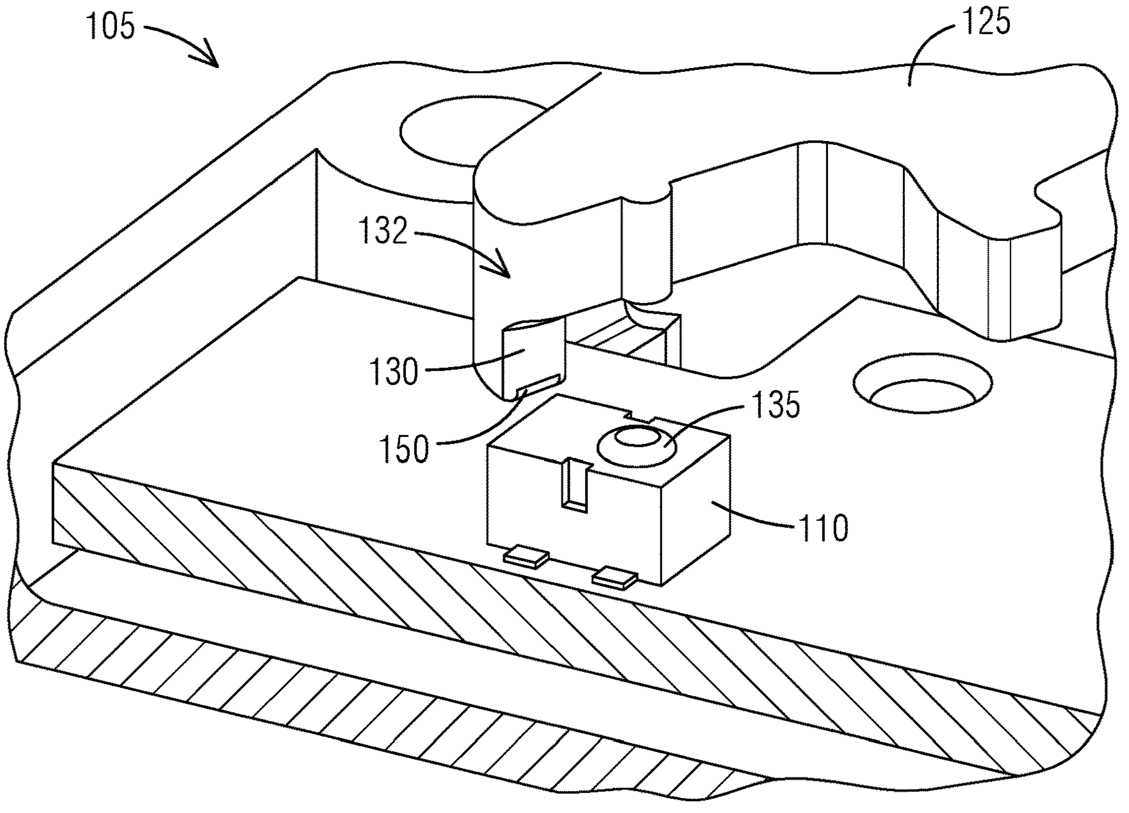
FIG. 6 illustrates a projection on a handle to actuate a secondary switch with the secondary switch in an open state in accordance with an exemplary embodiment of the present invention.

Consistent with one embodiment, the handle 125 and the projection 130 comprises a glass reinforced plastic material. In accordance with one embodiment, the projection 130 is shaped in an elongated shape with a tip 150 (as seen in FIGS. 5, 6) to change a state of the stationary switch 110 from one state to another state.

According to one embodiment, the secondary switch 110 is a micro switch with two states of operation including an ON state and an OFF state. The micro switch has an ON-OFF button 135 (as shown in FIG. 6) pivotally mounted to operate a switching mechanism (not seen) of the secondary switch 110.

The projection 130 is directly facing the ON-OFF button 135 and is positioned near the ON-OFF button 135 to operate the secondary switch 110 in the ON state and in the OFF state by pressing on it and applying an actuation force sufficient to change a state of the secondary switch 110.

When the handle 125 is moving to an OFF position the secondary switch 110 is actuated while the primary main contacts 115(1-2) are still closed. When the handle 125 is in an ON position the secondary switch 110 is in the ON state while the primary main contacts 115(1-2) are closed. When the handle 125 is in an OFF position the secondary switch 110 is in the OFF state while the primary main contacts 115(1-2) are opened.

In operation, movement of the handle 125 moves the projection 130 as it is an integral part of it thus causes the tip 150 to strike or press the ON-OFF button 135. Actuation of the ON-OFF button 135 causes the secondary switch 110 to change its state from ON to OFF or OFF to ON. The secondary switching system 107 is positioned before in a line of order of operation within the solid-state circuit breaker's 105 main mechanism 120 such that the secondary switch 110 is actuated prior to the solid-state circuit breaker's 105 primary main contacts 115(1-2) opening. In other words, that secondary switch 110 is operated first before the primary main contacts 115(1-2) are operated. This timing sequence of operation between the secondary switch 110 and the primary main contacts 115(1-2) ensures the electronics 112 are turned off before the primary main contacts 115(1-2) gets opened by the main mechanism 120.

Figure 2:
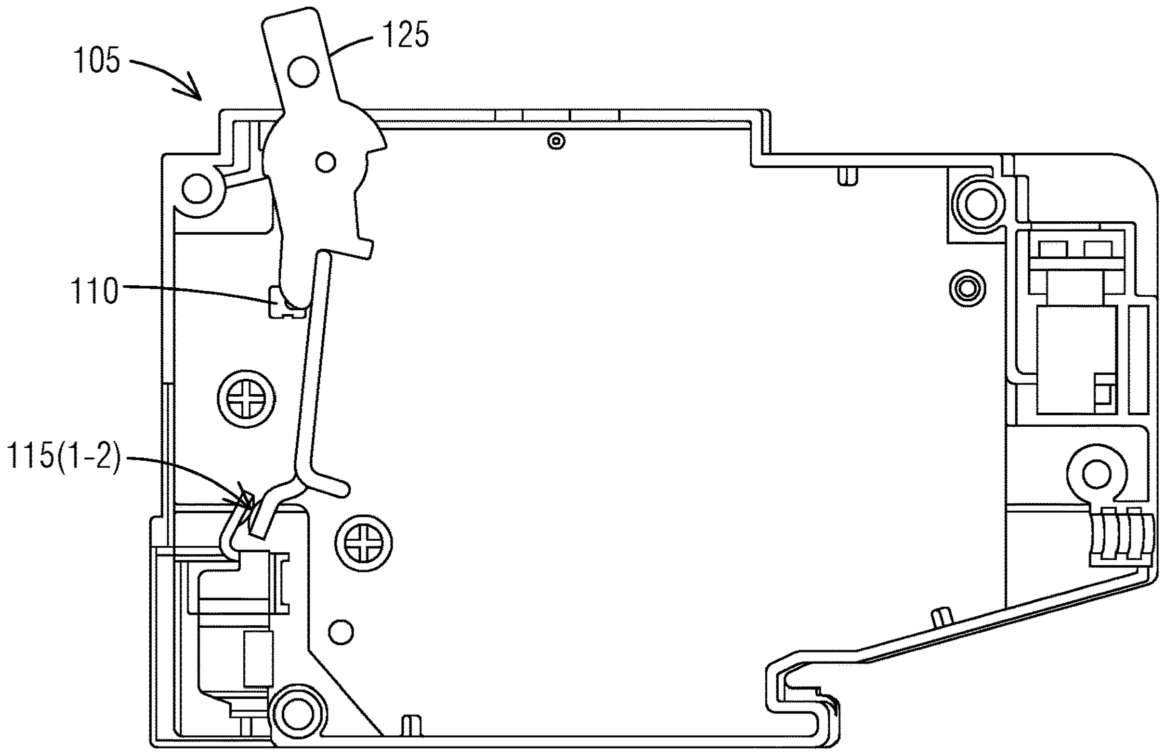
FIG. 2 illustrates a solid-state circuit breaker with a handle in an ON position in accordance with an exemplary embodiment of the present invention.

Referring to FIG. 2, it illustrates the solid-state circuit breaker 105 with the handle 125 in an ON position in accordance with an exemplary embodiment of the present invention. The primary main contacts 115(1-2) are closed. The secondary switch 110 is in the ON state.

Figure 3:
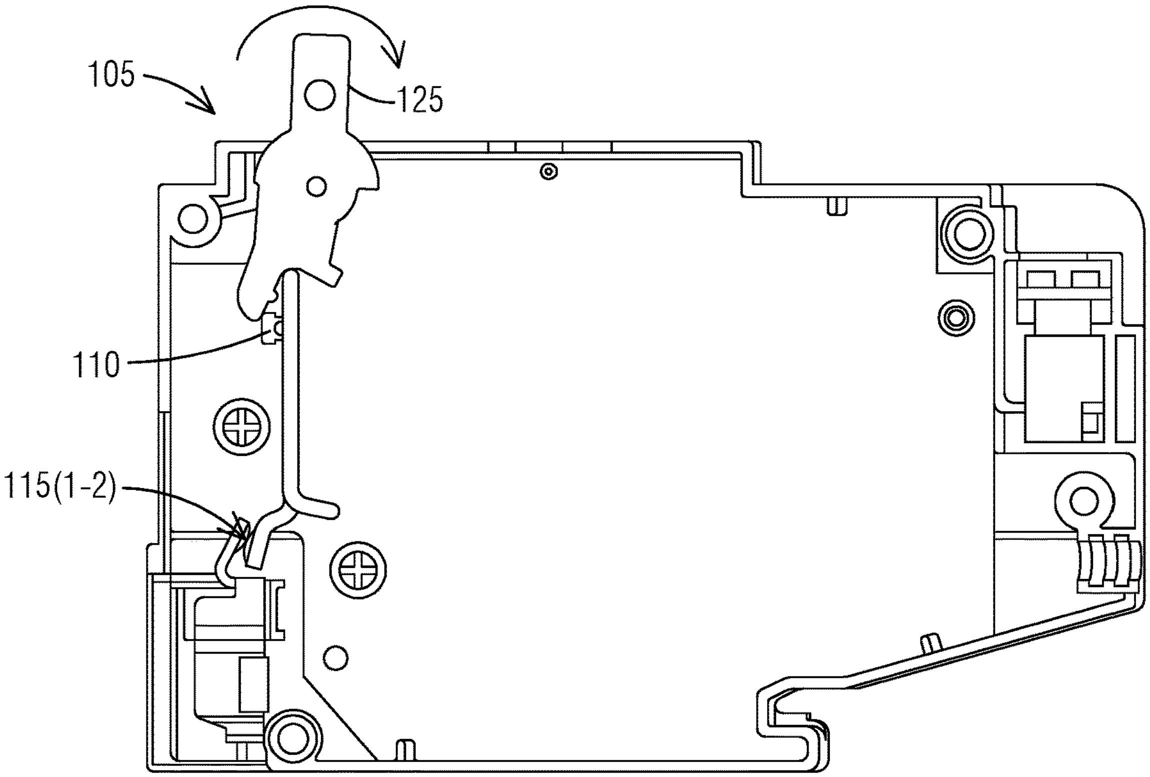
FIG. 3 illustrates a solid-state circuit breaker with a handle moving to an OFF position in accordance with an exemplary embodiment of the present invention.

Turning now to FIG. 3, it illustrates the solid-state circuit breaker 105 with the handle 125 moving to an OFF position in accordance with an exemplary embodiment of the present invention. When the handle 125 is moving to an OFF position the secondary switch 110 is actuated while the primary main contacts 115(1-2) are still closed.

Figure 4:
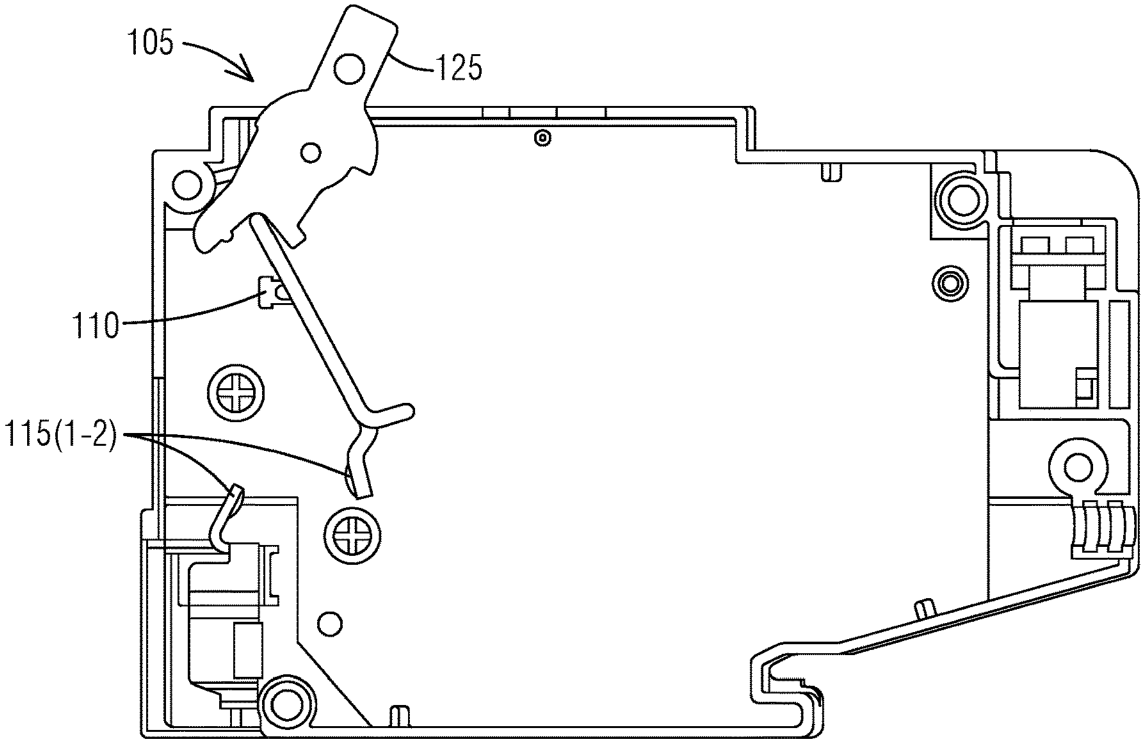
FIG. 4 illustrates a solid-state circuit breaker with a handle in the OFF position in accordance with an exemplary embodiment of the present invention.

FIG. 4 illustrates the solid-state circuit breaker 105 with the handle 125 in the OFF position in accordance with an exemplary embodiment of the present invention. When the handle 125 is in an OFF position the secondary switch 110 is in the OFF state while the primary main contacts 115(1-2) are opened.

As seen in FIG. 5, it illustrates the projection 130 integrally formed on the handle 125 to actuate the secondary switch 110 with an actuation force in accordance with an exemplary embodiment of the present invention. The secondary switch 110 in shown in a closed state. In the closed state, the secondary switch 110 is turned ON and the electronics 112 are turned OFF.

As shown in FIG. 6, it illustrates the projection 130 integrally formed on the handle 125 such that when the handle 125 moves the projection 130 simultaneously moves an equidistance in accordance with an exemplary embodiment of the present invention. The secondary switch 110 in shown in an open state. On a line of movement sequence, the secondary switch 110 gets operated by the projection 130 first before a contact arm will open the primary main contacts 115(1-2).

Figure 7:
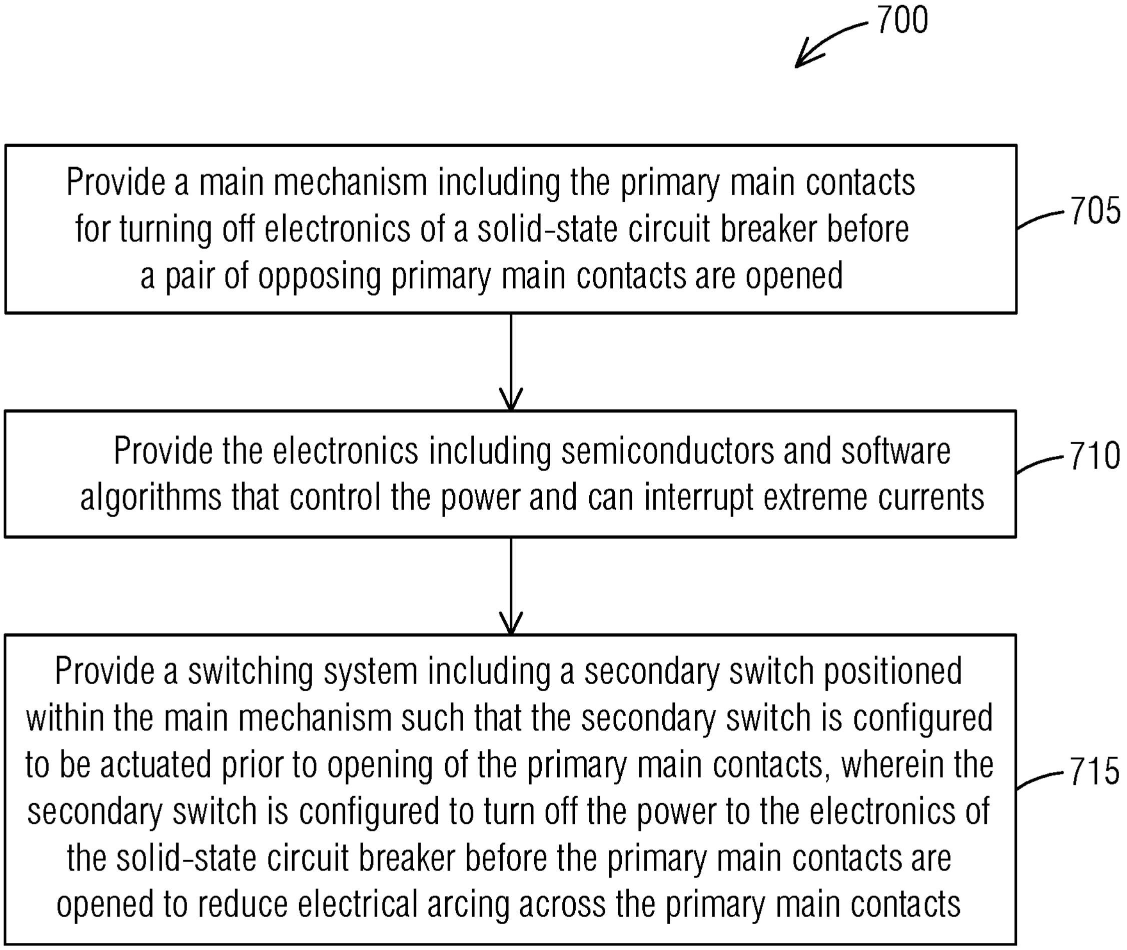
FIG. 7 illustrates a schematic view of a flow chart of a method of turning off electronics of a solid-state circuit breaker before a pair of opposing primary main contacts are opened in accordance with an exemplary embodiment of the present invention.

In FIG. 7, it illustrates a schematic view of a flow chart of a method 700 of turning off the electronics 112 of the solid-state circuit breaker 105 before the pair of opposing primary main contacts 115(1-2) are opened in accordance with an exemplary embodiment of the present invention. Reference is made to the elements and features described in FIGS. 1-6. It should be appreciated that some steps are not required to be performed in any particular order, and that some steps are optional.

The method 700 comprises a step 705 of providing the main mechanism 120 including the primary main contacts 115(1-2). The method 700 further comprises a step 710 of providing the electronics 112 including semiconductors and software algorithms that control the power and can interrupt currents. The method 700 further comprises a step 715 of providing the secondary switching system 107 including the secondary switch 110 positioned within the main mechanism 120 such that the secondary switch 110 is configured to be actuated prior to opening of the primary main contacts 115(1-2). The secondary switch 110 is configured to turn off the power to the electronics 112 of the solid-state circuit breaker 105 before the primary main contacts 115(1-2) are opened to eliminate or reduce electrical arcing across the primary main contacts 115(1-2).

The method 700 further comprises a step of providing a handle that turns ON and OFF the solid-state circuit breaker. The method 700 further comprises a step of providing a projection formed on a distal end of the handle to directly actuate the secondary switch.

While an electro-mechanical micro switch is described here a range of one or more other switches are also contemplated by the present invention. For example, other switches may be implemented based on one or more features presented above without deviating from the spirit of the present invention.

The techniques described herein can be particularly useful for a solid-state circuit breaker. While particular embodiments are described in terms of the solid-state circuit breaker, the techniques described herein are not limited to such designs but can also be used with other residential circuit breakers.

While embodiments of the present invention have been disclosed in exemplary forms, it will be apparent to those skilled in the art that many modifications, additions, and deletions can be made therein without departing from the spirit and scope of the invention and its equivalents, as set forth in the following claims.

Embodiments and the various features and advantageous details thereof are explained more fully with reference to the non-limiting embodiments that are illustrated in the accompanying drawings and detailed in the following description. Descriptions of well-known starting materials, processing techniques, components and equipment are omitted so as not to unnecessarily obscure embodiments in detail. It should be understood, however, that the detailed description and the specific examples, while indicating preferred embodiments, are given by way of illustration only and not by way of limitation. Various substitutions, modifications, additions and/or rearrangements within the spirit and/or scope of the underlying inventive concept will become apparent to those skilled in the art from this disclosure.

As used herein, the terms "comprises," "comprising," "includes," "including," "has," "having" or any other variation thereof, are intended to cover a non-exclusive inclusion. For example, a process, article, or apparatus that comprises a list of elements is not necessarily limited to only those elements but may include other elements not expressly listed or inherent to such process, article, or apparatus.

Additionally, any examples or illustrations given herein are not to be regarded in any way as restrictions on, limits to, or express definitions of, any term or terms with which they are utilized. Instead, these examples or illustrations are to be regarded as being described with respect to one particular embodiment and as illustrative only. Those of ordinary skill in the art will appreciate that any term or terms with which these examples or illustrations are utilized will encompass other embodiments which may or may not be given therewith or elsewhere in the specification and all such embodiments are intended to be included within the scope of that term or terms.

In the foregoing specification, the invention has been described with reference to specific embodiments. However, one of ordinary skill in the art appreciates that various modifications and changes can be made without departing from the scope of the invention. Accordingly, the specification and figures are to be regarded in an illustrative rather than a restrictive sense, and all such modifications are intended to be included within the scope of invention.

Although the invention has been described with respect to specific embodiments thereof, these embodiments are merely illustrative, and not restrictive of the invention. The description herein of illustrated embodiments of the invention is not intended to be exhaustive or to limit the invention to the precise forms disclosed herein (and in particular, the inclusion of any particular embodiment, feature or function is not intended to limit the scope of the invention to such embodiment, feature or function). Rather, the description is intended to describe illustrative embodiments, features and functions in order to provide a person of ordinary skill in the art context to understand the invention without limiting the invention to any particularly described embodiment, feature or function. While specific embodiments of, and examples for, the invention are described herein for illustrative purposes only, various equivalent modifications are possible within the spirit and scope of the invention, as those skilled in the relevant art will recognize and appreciate. As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

Respective appearances of the phrases "in one embodiment," "in an embodiment," or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

It will also be appreciated that one or more of the elements depicted in the drawings/figures can also be implemented in a more separated or integrated manner, or even removed or rendered as inoperable in certain cases, as is useful in accordance with a particular application.

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component.

What is claimed is:

1. A solid-state circuit breaker, comprising:

a main mechanism including a pair of opposing primary main contacts;

electronics including semiconductors and software algorithms that control the power and can interrupt currents; and a secondary switching system integrated with the solid-state circuit breaker such that the secondary switching system is strategically positioned within the main mechanism of the solid-state circuit breaker, wherein the secondary switching system including a secondary switch that is configured to be actuated prior to opening of the primary main contacts, wherein the secondary switch is configured to turn off the power to the electronics of the solid-state circuit breaker before the primary main contacts are opened to eliminate or reduce electrical arcing across the primary main contacts, and wherein there are two handle OFF position states wherein in one handle OFF position state the primary main contacts close and in another handle OFF position state the primary main contacts open.

2. The solid-state circuit breaker of claim 1, further comprising:

a handle that turns ON and OFF the solid-state circuit breaker; and a projection formed on a distal end of the handle to directly actuate the secondary switch.

3. The solid-state circuit breaker of claim 2, wherein the secondary switch is a micro switch with two states of operation including an ON state and an OFF state.

4. The solid-state circuit breaker of claim 3, wherein the micro switch having an ON-OFF button pivotally mounted to operate a switching mechanism of the secondary switch.

5. The solid-state circuit breaker of claim 4, wherein the projection is directly facing the ON-OFF button and is positioned near the ON-OFF button to operate the secondary switch in the ON state and in the OFF state by pressing on it and applying an actuation force sufficient to change a state of the secondary switch.

6. The solid-state circuit breaker of claim 2, wherein when the handle is moving to an OFF position the secondary switch is actuated while the primary main contacts are still closed.

7. The solid-state circuit breaker of claim 2, wherein when the handle is in an ON position the secondary switch is in the ON state while the primary main contacts are closed.

8. The solid-state circuit breaker of claim 2, wherein when the handle is in an OFF position the secondary switch is in the OFF state while the primary main contacts are opened.

9. The solid-state circuit breaker of claim 2, wherein the handle and the projection comprises glass reinforced plastics.

10. The solid-state circuit breaker of claim 2, wherein the projection is shaped in an elongated shape with a tip to change a state of the stationary switch from one state to another state.

11. A method of turning off electronics of a solid-state circuit breaker before a pair of opposing primary main contacts are opened, the method comprising:

providing a main mechanism including the primary main contacts;

providing the electronics including semiconductors and software algorithms that control the power and can interrupt currents;

providing a secondary switching system integrated with the solid-state circuit breaker such that the secondary switching system is strategically positioned within the main mechanism of the solid-state circuit breaker, wherein the secondary switching system including a secondary switch that is configured to be actuated prior to opening of the primary main contacts, wherein the secondary switch is configured to turn off the power to the electronics of the solid-state circuit breaker before the primary main contacts are opened to eliminate or reduce electrical arcing across the primary main contacts, and wherein there are two handle OFF position states wherein in one handle OFF position state the primary main contacts close and in another handle OFF position state the primary main contacts open.

12. The method of claim 11, further comprising:

providing a handle that turns ON and OFF the solid-state circuit breaker; and providing a projection formed on a distal end of the handle to directly actuate the secondary switch.

13. The method of claim 12, wherein the secondary switch is a micro switch with two states of operation including an ON state and an OFF state.

14. The method of claim 13, wherein the micro switch having an ON-OFF button pivotally mounted to operate a switching mechanism of the secondary switch.

15. The method of claim 14, wherein the projection is directly facing the ON-OFF button and is positioned near the ON-OFF button to operate the secondary switch in the ON state and in the OFF state by pressing on it and applying an actuation force sufficient to change a state of the secondary switch.

16. The method of claim 12, wherein when the handle is moving to an OFF position the secondary switch is actuated while the primary main contacts are still closed.

17. The method of claim 12, wherein when the handle is in an ON position the secondary switch is in the ON state while the primary main contacts are closed.

18. The method of claim 12, wherein when the handle is in an OFF position the secondary switch is in the OFF state while the primary main contacts are opened.

19. The method of claim 12, wherein the handle and the projection comprises glass reinforced plastics.

20. The method of claim 12, wherein the projection is shaped in an elongated shape with a tip to change a state of the stationary switch from one state to another state.

* * * * *